(12) United States Patent
Lee (10) Patent No.: US 9,102,346 B2
(45) Date of Patent: Aug. 11, 2015

(54) QUICKLY LIFTING HYDRAULIC PALLET TRUCK

(76) Inventor: Wen-Ching Lee, New Taipei (TW)

( * ) Notice: Subject to any disclaimer, the term of this patent is extended or adjusted under 35 U.S.C. 154(b) by 232 days.

(21) Appl. No.: 13/610,952

(22) Filed: Sep. 12, 2012

(65) Prior Publication Data

US 2014/0070151 A1 Mar. 13, 2014

(51) Int. Cl.
*B66F 3/24* (2006.01)
*B62B 3/06* (2006.01)
*B62B 5/06* (2006.01)

(52) U.S. Cl.
CPC .............. *B62B 3/0618* (2013.01); *B62B 5/063* (2013.01)

(58) Field of Classification Search
USPC .......................................................... 254/2 R
See application file for complete search history.

(56) References Cited

U.S. PATENT DOCUMENTS

| | | | | | |
|---|---|---|---|---|---|
| 3,701,211 | A | * | 10/1972 | Best | 280/43.12 |
| 3,843,147 | A | * | 10/1974 | Fredricson | 280/43.12 |
| 4,497,501 | A | * | 2/1985 | Kedem | 280/43.12 |
| 4,589,669 | A | * | 5/1986 | Kedem | 280/43.12 |
| 4,921,385 | A | * | 5/1990 | Okuno | 414/21 |
| 4,969,794 | A | * | 11/1990 | Larsen | 414/495 |
| 6,511,080 | B2 | * | 1/2003 | Lee | 280/43.12 |
| 7,641,011 | B2 | * | 1/2010 | Fridlington et al. | 180/68.5 |
| 7,744,335 | B1 | * | 6/2010 | Cleary | 414/664 |
| 2002/0109317 | A1 | * | 8/2002 | Lee | 280/43.12 |
| 2002/0190489 | A1 | * | 12/2002 | Lee | 280/43.12 |

* cited by examiner

*Primary Examiner* — Lee D Wilson
*Assistant Examiner* — Alvin Grant
(74) *Attorney, Agent, or Firm* — Alan D. Kamrath; Kamrath IP Lawfirm, P.A.

(57) ABSTRACT

A lifting hydraulic pallet truck has a forked rack, a lever, a hydraulic assembly and a control rod. The forked rack has a mounting bracket and an abutting surface. The lever is mounted pivotally under the mounting bracket and has an abutting segment selectively abutting the abutting surface of the forked rack. The hydraulic assembly has a hydraulic seat, an active hydraulic cylinder and a quick reflowing device. The control rod is mounted pivotally above the hydraulic seat and is connected to the active hydraulic cylinder. Therefore, the user steps on the lever to quickly lift the forked rack to a certain height. The pre-lifted height allows the user to reduce the pivoting times for pivoting the control rod to a desired height.

11 Claims, 6 Drawing Sheets

QUICKLY LIFTING HYDRAULIC PALLET TRUCK

BACKGROUND OF THE INVENTION

1. Field of the Invention

The present invention relates to a hydraulic jack for a pallet truck and, especially, to a hydraulic jack quickly lifted by foot stepping.

2. Description of the Prior Arts

The hydraulic pallet trucks and pallets are used to transport goods and, especially, are used in a shopping mall or storehouse. A conventional hydraulic pallet truck has a forked rack with two platforms, a mounting bracket, an active hydraulic cylinder, an, inactive hydraulic assembly and a control rod. Two wheels are mounted under the platforms to allow the platforms to easily move on the ground. The mounting bracket is mounted on an end of the forked rack. The active hydraulic cylinder and the inactive hydraulic assembly are mounted on the mounting bracket. The control rod is mounted pivotally on the mounting bracket. The pumping rod of the inactive hydraulic assembly is connected to the forked rack. The control rod is connected to the active hydraulic cylinder. A hydraulic seat is connected between the active hydraulic cylinder and the inactive hydraulic assembly to connect the fluid passages thereof. The height of the forked rack is normally lower than the bottom surface of the pallets. When the user pivots the control rod to press down the pumping rod, the hydraulic fluid is pressed to push the lifting rod upward to lift the platform.

However, each time when the control rod is pivoted, the lift distance of the lifting rod is limited, so that the user needs to pivot the control rod for four or five times at least to lift the forked rack to reach the bottom surface of the pallets. Therefore, the conventional hydraulic pallet truck is not convenient to use and is not quickly used.

To overcome the shortcomings, the present invention provides a quickly lifting hydraulic pallet truck to mitigate or obviate the aforementioned problems.

SUMMARY OF THE INVENTION

The main objective of the present invention is to provide a quickly lifting hydraulic pallet truck. The lifting hydraulic pallet truck has a forked rack, a lever, a hydraulic assembly and a control rod. The forked rack has a mounting bracket and an abutting surface. The lever is mounted pivotally under the mounting bracket and has an abutting segment selectively abutting the abutting surface of the forked rack. The hydraulic assembly has a hydraulic seat, an active hydraulic cylinder and a quick reflowing device. The control rod is mounted pivotally above the hydraulic seat and is connected to the active hydraulic cylinder. Therefore, the user steps on the lever to quickly lift the forked rack in a certain height. The pre-lifted height allows the user to reduce the pivoting times for pivoting the control rod to a desired height.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
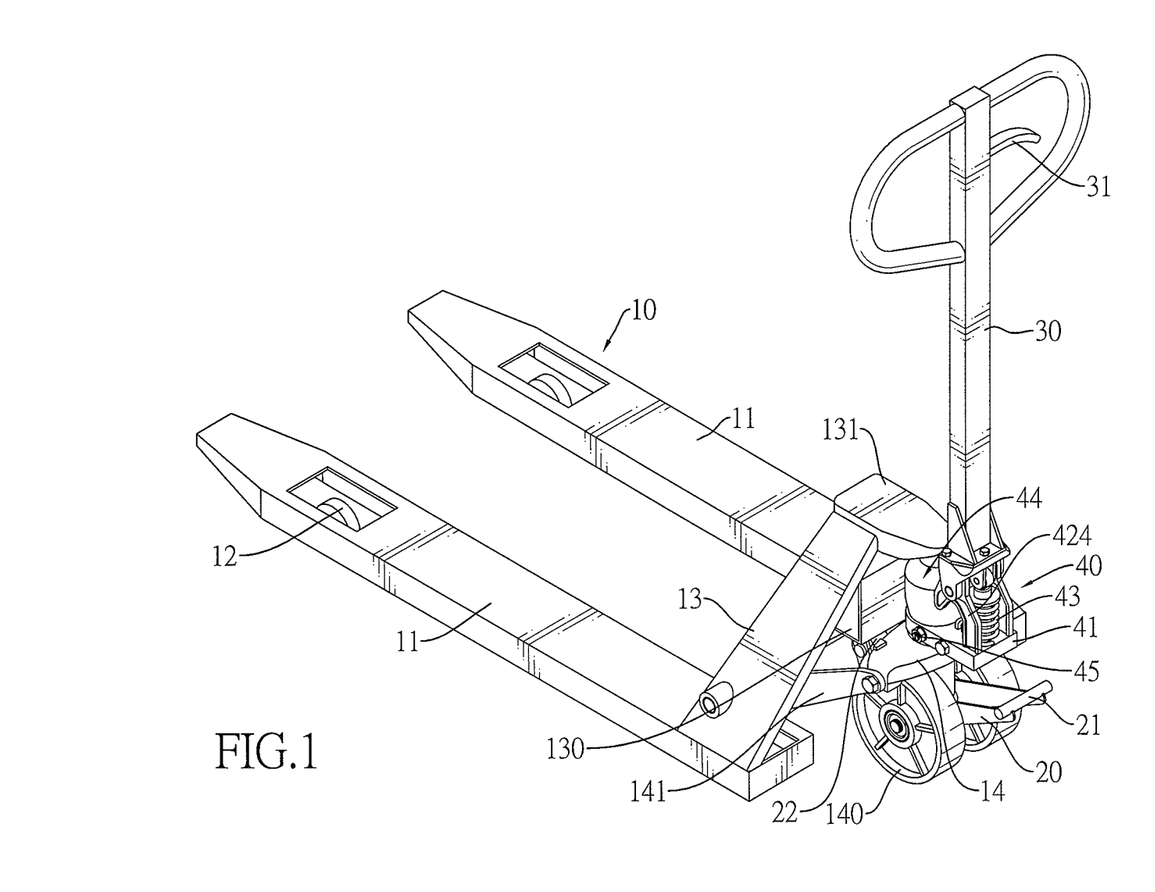
FIG. 1 is a perspective view of a quickly lifting hydraulic pallet truck in accordance with the present invention.
Figure 2:
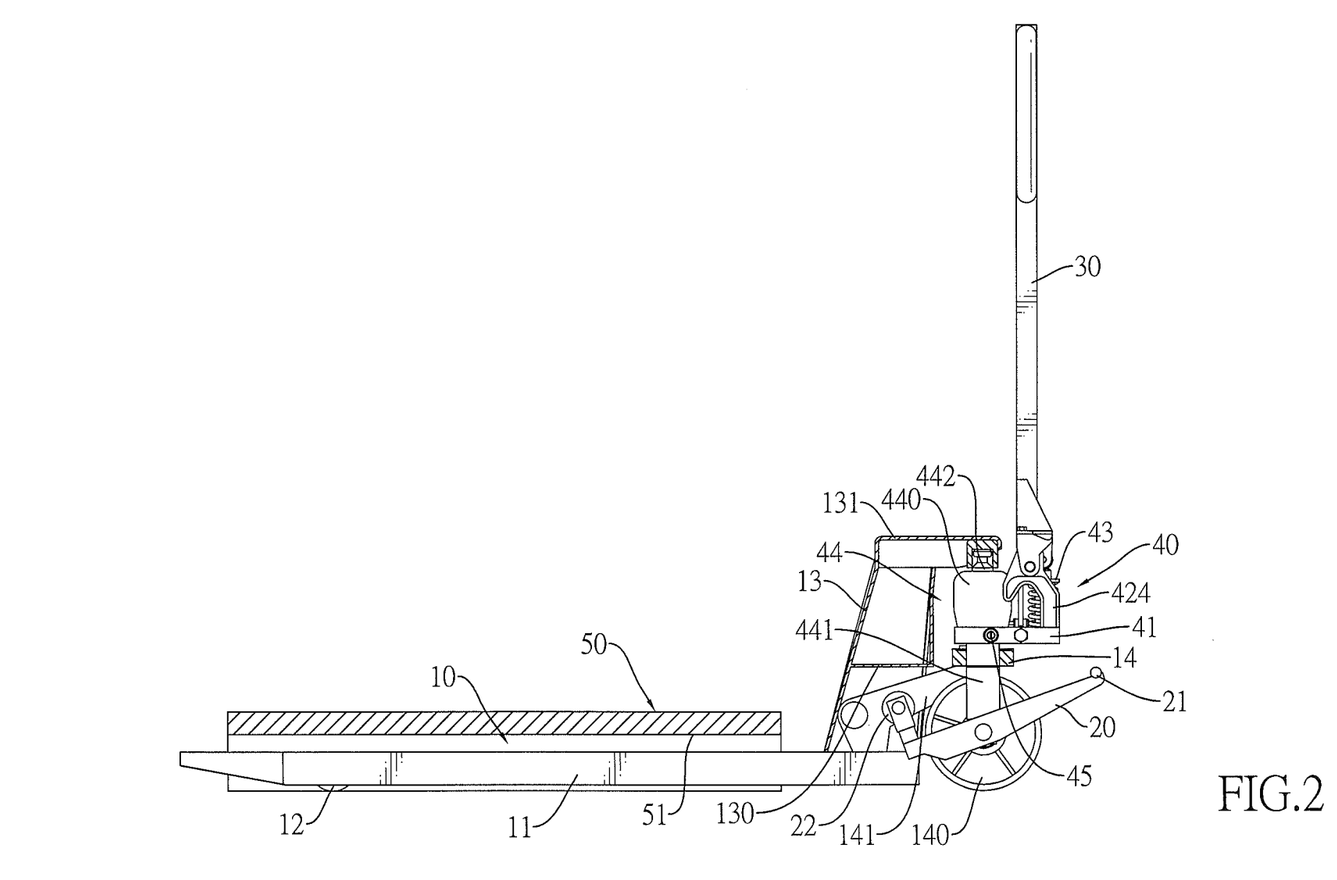
FIG. 2 is a side view in partial section of the quickly lifting hydraulic pallet truck in FIG. 1.
Figure 3:
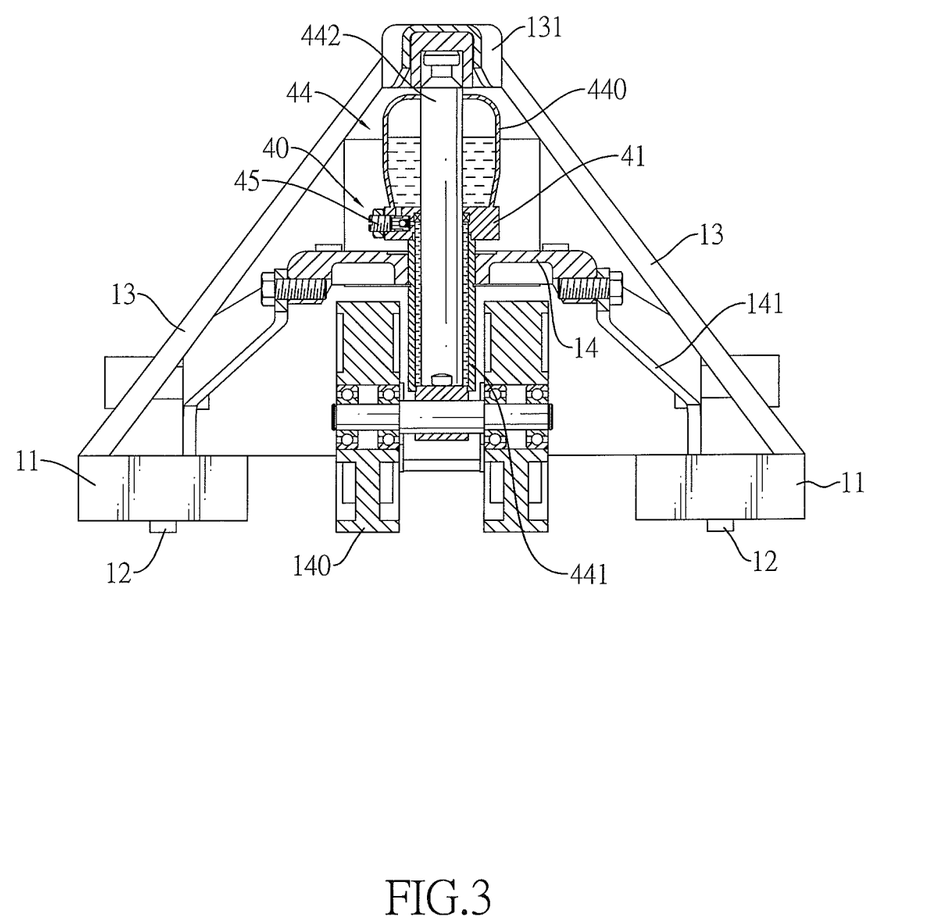
FIG. 3 is an enlarged partial end view in partial section of the quickly lifting hydraulic pallet truck in FIG. 1.

With reference to FIGS. 1 and 2, the quickly lifting hydraulic pallet truck in accordance with the present invention comprises a forked rack 10, a lever 20, a hydraulic assembly 40 and a control rod 30.

The forked rack 10 has a base 13, two platforms 11, two accessory wheels 12, a mounting bracket 14 and a holding frame 424. The base 13 comprises an abutting surface 130 formed on a bottom of the base 13 and a connecting board 131 formed on a top of the base 13. The platforms 11 are mounted separately and protrude from a front side of the base 13. The accessory wheels 12 are mounted respectively on a bottom of the platforms 11. The mounting bracket 14 is connected securely to a rear side of the base 13 through two connecting rods 141 and has two main wheels 140 mounted separately on a bottom of the mounting bracket. The holding frame 424 is formed on a top surface of the mounting bracket 14 and has a first side and a second side.

The lever 20 is connected pivotally to the mounting bracket 14 and has a middle part, a front end 21, a rear end and an abutting segment 22. The middle part is connected pivotally to the mounting bracket 14. The front end 21 extends out of a front of the lever 20. The abutting segment may be a roller, is mounted on the rear end of the lever 20 and selectively abuts the abutting surface 130 of the base 13.

With reference to FIGS. 1 to 5, the hydraulic assembly 40 is connected to the mounting bracket 14 and comprises a hydraulic seat 41, a cartridge assembly 42, an active hydraulic cylinder 43, an inactive hydraulic assembly 44 and a quick reflowing device 45.

Figure 4:
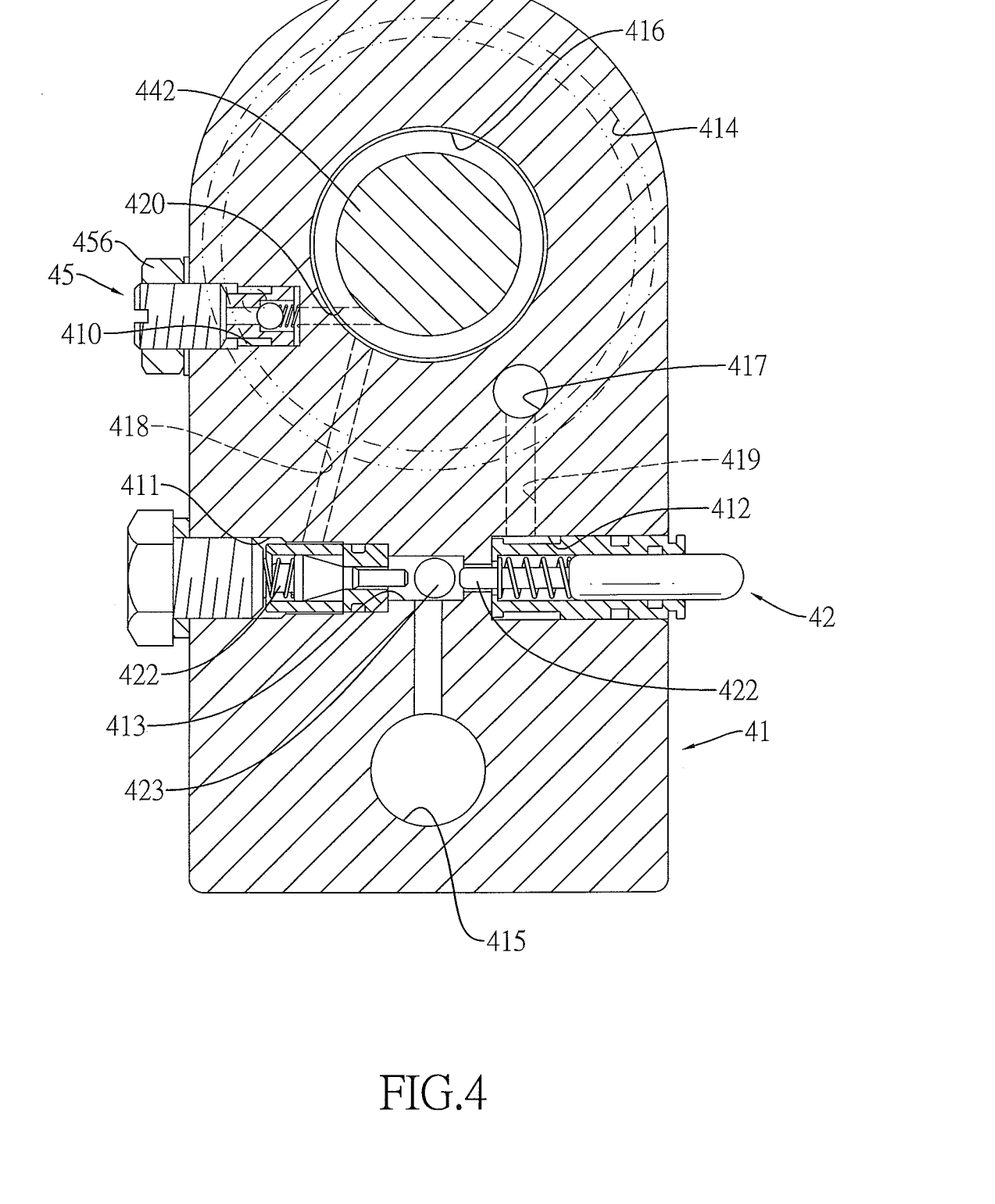
FIG. 4 is a top view in partial section of the hydraulic seat of the quickly lifting hydraulic pallet truck in FIG. 1.
Figure 5:
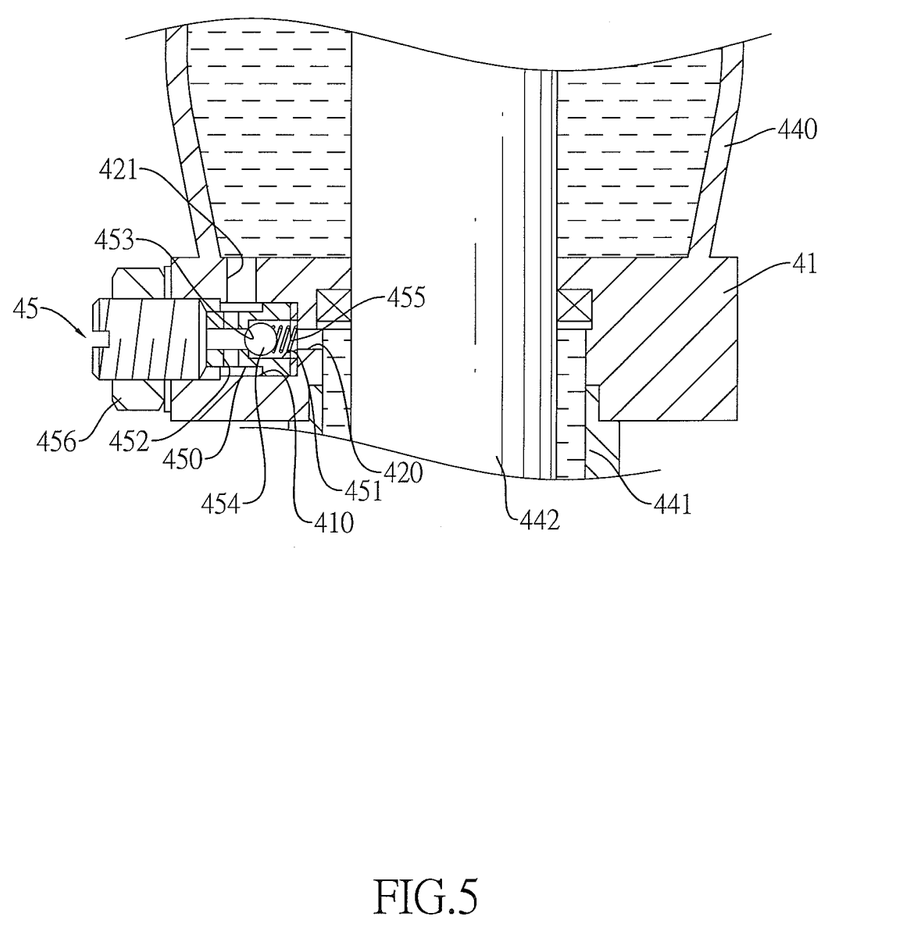
FIG. 5 is an enlarged partial end view in partial section of the quickly lifting hydraulic pallet truck in FIG. 1.

With reference to FIGS. 4 and 5, the hydraulic seat 41 is attached to the top surface of the mounting bracket 14 between the first and second sides of the holding frame 424 and has a fluid route. The fluid route comprises a first chamber 410, a second chamber 411, third chamber 412, a connecting chamber 413, a first mounting recess 414, a second mounting recess 415, an opening 416, a fluid inlet 417, a first passage 418, a second passage 419, a third passage 420 and a fourth passage 421. The first chamber 410 is formed transversely on a first side of the hydraulic seat 41 and has inner threads. The second chamber 411 is formed transversely through the first side of the hydraulic seat 41 and is formed separately from the first chamber 410. The third chamber 412 is formed transversely through the second side of the hydraulic seat 41 and aligns with the first chamber 411. The connecting chamber 413 is formed between and communicates with the second and third chambers 411, 412. The first recess 414 is formed on a top surface of the hydraulic seat 41 and is near a rear end of the hydraulic seat 41. The second recess 415 is formed on the top surface of the hydraulic seat 41, is near a front end of the hydraulic seat 41 and communicates with the connecting chamber 413. The opening 416 is formed in the first mounting recess 414 of the hydraulic seat 41. The fluid inlet 417 is formed in the top surface of the hydraulic seat 41 and is adjacent to the opening 416. The first passage 418 is formed between and communicates with the second chamber 411 and the opening 416. The second passage 419 is formed between and communicates with the third chamber 412 and the fluid inlet 417. The third passage 420 is formed between and communicates with the first chamber 410 and the opening 416. The fourth passage 421 is formed between and communicates with the first chamber 410 and the first mounting recess 414.

The cartridge assembly 42 is mounted in the fluid route in the hydraulic seat 41, may be a ball check valve and comprises two valve rods 422, two valve springs and a ball 423. The valve rods 422 are mounted respectively in the second and third chambers 411, 412 in the hydraulic seat 41 and align with each other. The valve springs are mounted respectively around the valve rods 422. The ball 423 is mounted movably in the connecting chamber 413. Because the cartridge assembly 42 is well known in the skill of the art, the unnecessary details of the related operation and the related structure are not described here.

With reference to FIGS. 1 to 5, the active hydraulic cylinder 43 is mounted on the second mounting recess 415 of the hydraulic seat 41, communicates with the connecting chamber 413 and has an active pumping rod.

The inactive hydraulic assembly 44 is mounted on the hydraulic seat 41 and comprises a reservoir 440, an inactive hydraulic cylinder 441 and a pumping rod 442. The reservoir 440 is mounted on the first mounting recess 414 of the hydraulic seat 41, communicates with the fluid inlet 417 and the fourth passage 421 of the hydraulic seat 41 and contains hydraulic oil therein. The inactive hydraulic cylinder 441 is mounted on a bottom surface of the hydraulic seat 41, communicates with the first passage 418 and the third passage 420, contains hydraulic oil therein and is mounted above the lever 20 and the main wheels 140. The pumping rod 442 is longitudinally mounted slidably through the reservoir 440, the hydraulic seat 41 and the inactive hydraulic cylinder 441. A top end of the pumping rod 442 protrudes on a top of the reservoir 440 and is connected to the connecting board 131 of the forked rack 10.

With reference to FIGS. 4 and 5, the quick reflowing device 45 is connected to the hydraulic seat 41, may be cylindrical and has a body, a guiding recess 450, a first guiding hole 451, a second guiding hole 452, a shoulder 453, a ball 454, a spring 455 and a nut 456. The body is inserted into the first chamber 410 of the hydraulic seat 41 and has outer threads screwing onto the inner threads of the first chamber 410. The guiding recess 450 is formed around the body. The first guiding hole 451 is formed on an inner end of the body and communicates with the third passage 420 of the hydraulic seat 41. The second guiding hole 452 is formed transversely through the body, selectively communicates with the first guiding hole 451, is wider than the first guiding hole 451 and communicates with the fourth passage 421 of the hydraulic seat 41. The shoulder 453 is formed between the first and second guiding holes 451, 452. The ball 454 is mounted in the first guiding hole 451, abuts the shoulder 453 and selectively blocks the communication between the first and second guiding holes 451, 452. The spring 455 is mounted in the first guiding hole 451 and is clamped between the ball 454 and the third passage 420 of the hydraulic seat 41. The nut 456 is screwed onto the outer end of the body and abuts the hydraulic seat 41 to hold the body of the quick reflowing device 45 in position.

The control rod 30 is mounted pivotally on the mounting bracket 14 and may be connected pivotally to the holding frame 424 of the hydraulic seat 41. The control rod 30 is connected to the active pumping rod of the active hydraulic cylinder 43 and has a releasing button 31 formed thereon and connecting to the valve rod 422 of the cartridge assembly 42.

With reference to FIGS. 1 to 4, the quickly lifting hydraulic pallet truck is operated normally. The forked rack 10 is moved upward to engage bottom surface 51 and to lift the pallets 50 by the platforms 11. When the control rod 30 is pivoted, the control rod 30 actuates the active hydraulic cylinder 43. The hydraulic oil flows in sequence through the fluid inlet 417, the second passage 419, the third chamber 412, the connecting chamber 413, the second chamber 411 and the first passage 418 to the inactive hydraulic cylinder 441 by the operation of the active hydraulic cylinder 43 and the cartridge assembly 42. The hydraulic oil in the inactive hydraulic cylinder 441 pushes the bottom of the pumping rod 442 to move upward, so that the forked rack 10 is lifted for a certain height. To pivot the control rod 30 multiple times, the forked rack 10 is lifted to a predetermined height. Therefore, the pallets 50 on the platforms 11 are also lifted to easily move the goods on the pallets 50.

Figure 6:
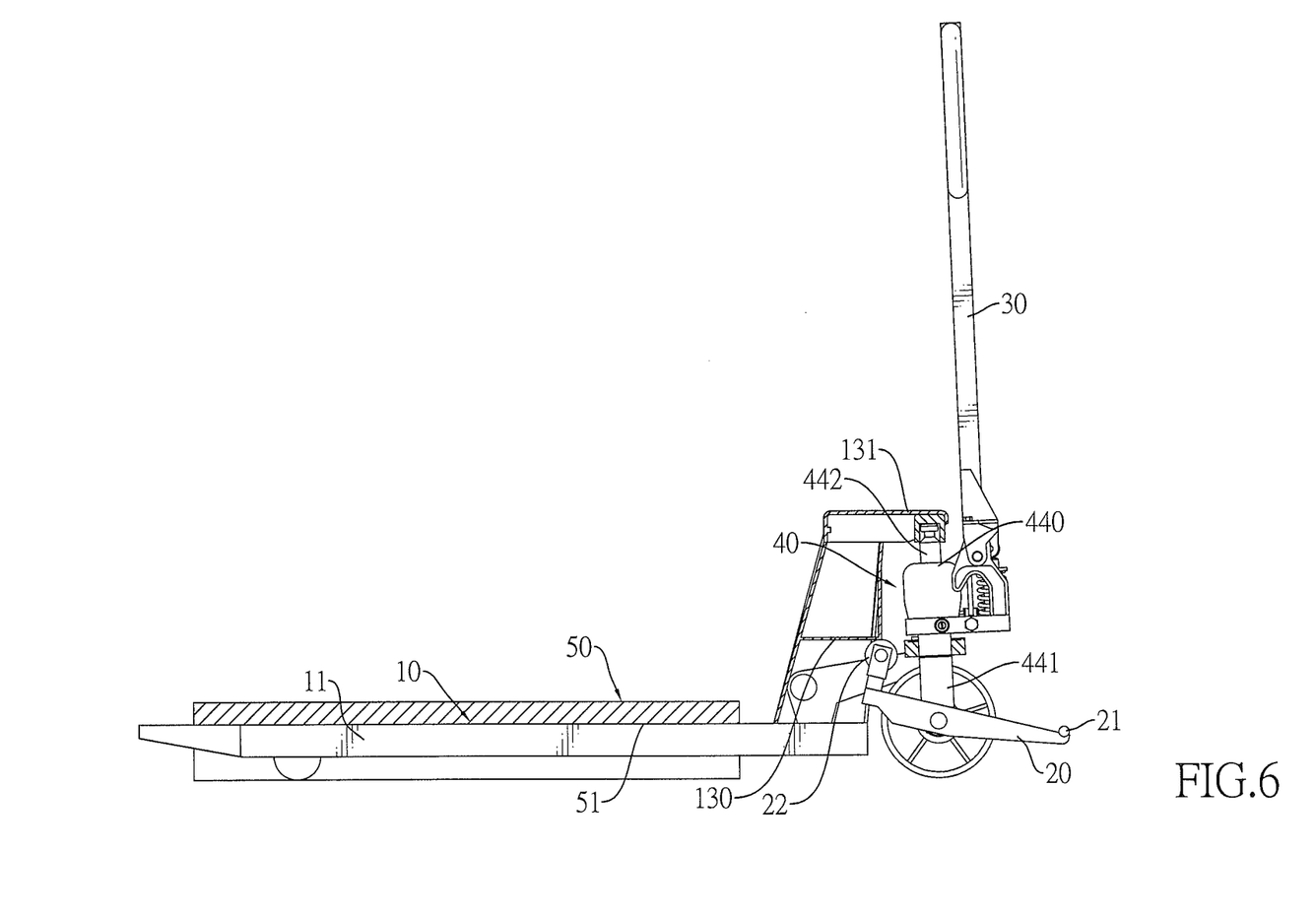
FIG. 6 is an operational side view in partial section of the quickly lifting hydraulic pallet truck, shown with the forked rack lifted.

With further reference to FIGS. 5 and 6, the quickly lifting hydraulic pallet truck as described is operated to lift the forked rack 10 quickly. The user steps on the front end 21 of the lever 20, so that the abutting segment 22 abuts the abutting surface 130 of the forked rack 10 to directly lift the forked rack 10 to a predetermined height. When the connecting board 131 is moved upward, the pumping rod 442 is also moved upward. Then, the volume of the pumping rod 442 mounted in the inactive hydraulic cylinder 441 is reduced, so that the liquid pressure in the inactive hydraulic cylinder 441 is smaller than the liquid pressure in the reservoir 440. Therefore, the liquid pressure in the first guiding hole 451 is smaller than the liquid pressure in the second guiding hole 452. Then, the ball 454 in the first guiding hole 451 is pushed to leave the shoulder 453 and allows the first and second guiding holes 451, 452 to communicate with each other. Thus, the hydraulic oil in the reservoir 440 can flow in sequence through the fourth passage 421, the guiding recess 450, the second guiding hole 452, the first guiding hole 451 and the third passage 420 to the inactive hydraulic cylinder 441 to balance the liquid pressure in the reservoir 440 and the inactive hydraulic cylinder 441. Then, the forked rack 10 is pre-lifted for a certain height quickly, and the user can pivot the control rod 30 for limited times to quickly lift the pallets through the forked rack 10.

With reference to FIGS. 1 and 4, the forked rack 10 is lowered down to the original height. The user presses the releasing button 31 to move the valve rod 422 in the third chamber 412, so that the cartridge assembly 42 allows the liquid to move bi-directionally. Then, the hydraulic oil in the inactive hydraulic cylinder 441 reflows back into the reservoir 440, and the pumping rod 442 and the forked rack 10 are accordingly moved downward to the original position.

The hydraulic pallet truck as described has the following advantages. With the lever 20, the forked rack 10 is quickly lifted to a certain height. With the quick reflowing device 45, the forked rack 10 is maintained at the pre-lifted height stably. Therefore, the hydraulic pallet truck as described is quickly lifted to a predetermined height without pivoting the control rod 30 many times.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A quickly lifting hydraulic pallet truck comprising:
   a forked rack having:
      a base having an abutting surface formed on a bottom of the base and a connecting board formed on a top of the base; and
      a mounting bracket connected securely to a rear side of the base through two connecting rods and having two main wheels mounted separately on a bottom of the mounting bracket;
   a lever connected pivotally to the mounting bracket and having:
      a middle part;
      a front end extending out of a front of the lever;
      a rear end; and
      an abutting segment mounted on the rear end of the lever and selectively abutting the abutting surface of the base;
   a hydraulic assembly connected to the mounting bracket; and
   a control rod mounted pivotally on the mounting bracket and connected to the hydraulic assembly, wherein the middle part is connected pivotally to the mounting bracket and is located intermediate the front end and the rear end, with the abutting segment adjusting a height of the base relative to the mounting bracket when the front end is stepped upon.

2. A quickly lifting hydraulic pallet truck comprising:
   a forked rack having:
      a base having an abutting surface formed on a bottom of the base and a connecting board formed on a top of the base; and
      a mounting bracket connected securely to a rear side of the base through two connecting rods and having two main wheels mounted separately on a bottom of the mounting bracket;
   a lever connected pivotally to the mounting bracket and having:
      a middle part;
      a front end extending out of a front of the lever;
      a rear end; and
      an abutting segment mounted on the rear end of the lever and selectively abutting the abutting surface of the base;
   a hydraulic assembly connected to the mounting bracket; and
   a control rod mounted pivotally on the mounting bracket and connected to the hydraulic assembly, wherein the hydraulic assembly comprises:
      a hydraulic seat attached to a top surface of the mounting bracket and having a fluid route;
      a cartridge assembly mounted in the fluid route in the hydraulic seat;
      an active hydraulic cylinder mounted on the hydraulic seat and communicating with the fluid route in the hydraulic seat;
      an inactive hydraulic assembly mounted on the hydraulic seat and having:
         a reservoir containing hydraulic oil therein, mounted on the hydraulic seat and communicating with the fluid route in the hydraulic seat;
         an inactive hydraulic cylinder containing hydraulic oil therein, mounted on a bottom surface of the hydraulic seat and communicating with the fluid route in the hydraulic seat; and
         a pumping rod longitudinally mounted slidably through the reservoir, the hydraulic seat and the inactive hydraulic cylinder and having a top end of the pumping rod protruding on a top of the reservoir and connected to the connecting board of the forked rack; and
      a quick reflowing device connected to the hydraulic seat, mounted in the fluid route in the hydraulic seat and respectively communicating the reservoir and the inactive hydraulic cylinder; and
   wherein the control rod is mounted pivotally on the hydraulic seat and is connected to the active hydraulic cylinder and the cartridge assembly.

3. The quickly lifting hydraulic pallet truck as claimed in claim 2, wherein the abutting segment of the lever is a roller.

4. The quickly lifting hydraulic pallet truck as claimed in claim 2, wherein the fluid route in the hydraulic seat comprises:
   a first chamber formed transversely on a first side of the hydraulic seat;
   a third passage formed between and communicating with the first chamber and the inactive hydraulic cylinder; and
   a fourth passage formed between and communicating with the first chamber and the reservoir; and
   wherein the quick reflowing device is mounted in the first chamber and comprises:
      a body inserted into the first chamber of the hydraulic seat;
      a guiding recess formed around the body;
      a first guiding hole formed on an inner end of the body and communicating with the third passage of the hydraulic seat; and
      a second guiding hole formed transversely through the body, selectively communicating with the first guiding hole and communicating with the fourth passage of the hydraulic seat.

5. The quickly lifting hydraulic pallet truck as claimed in claim 3, wherein the fluid route in the hydraulic seat comprises:
   a first chamber formed transversely on a first side of the hydraulic seat;
   a third passage formed between and communicating with the first chamber and the inactive hydraulic cylinder; and
   a fourth passage formed between and communicating with the first chamber and the reservoir; and
   wherein the quick reflowing device is mounted in the first chamber and comprises:
      a body inserted into the first chamber of the hydraulic seat;
      a guiding recess formed around the body;
      a first guiding hole formed on an inner end of the body and communicating with the third passage of the hydraulic seat; and
      a second guiding hole formed transversely through the body, selectively communicating with the first guiding hole and communicating with the fourth passage of the hydraulic seat.

6. The quickly lifting hydraulic pallet truck as claimed in claim 4, wherein the second guiding hole of the quick reflowing device is wider than the first guiding hole of the quick reflowing device; and
   wherein the quick reflowing device further has:
      a shoulder formed between the first and second guiding holes;
      a ball mounted in the first guiding hole, abutting the shoulder and selectively blocking communication between the first and second guiding holes; and a spring mounted in the first guiding hole and clamped between the ball and the third passage of the hydraulic seat.

7. The quickly lifting hydraulic pallet truck as claimed in claim 5, wherein the second guiding hole of the quick reflowing device is wider than the first guiding hole of the quick reflowing device; and wherein the quick reflowing device further has:
- a shoulder formed between the first and second guiding holes;
- a ball mounted in the first guiding hole, abutting the shoulder and selectively blocking communication between the first and second guiding holes; and
- a spring mounted in the first guiding hole and clamped between the ball and the third passage of the hydraulic seat.

8. The quickly lifting hydraulic pallet truck as claimed in claim 6, wherein:
- the first chamber of the hydraulic seat has inner threads; and
- the body has outer threads screwing onto the inner threads of the first chamber of the hydraulic seat.

9. The quickly lifting hydraulic pallet truck as claimed in claim 7, wherein:
- the first chamber of the hydraulic seat has inner threads; and
- the body has outer threads screwing onto the inner threads of the first chamber of the hydraulic seat.

10. The quickly lifting hydraulic pallet truck as claimed in claim 8, wherein the fluid route of the hydraulic seat further comprises:
- a second chamber formed transversely through the first side of the hydraulic seat and formed separately from the first chamber;
- a third chamber formed transversely through a second side of the hydraulic seat and aligning with the first chamber;
- a connecting chamber formed between and communicating with the second and third chambers and the active hydraulic cylinder;
- a fluid inlet formed in a top surface of the hydraulic seat;
- a first passage formed between and communicating with the second chamber and the inactive hydraulic cylinder; and
- a second passage formed between and communicating with the third chamber, the fluid inlet and the reservoir.

11. The quickly lifting hydraulic pallet truck as claimed in claim 9, wherein the fluid route of the hydraulic seat further comprises:
- a second chamber formed transversely through the first side of the hydraulic seat and formed separately from the first chamber;
- a third chamber formed transversely through a second side of the hydraulic seat and aligning with the first chamber;
- a connecting chamber formed between and communicating with the second and third chambers and the active hydraulic cylinder;
- a fluid inlet formed in a top surface of the hydraulic seat;
- a first passage formed between and communicating with the second chamber and the inactive hydraulic cylinder; and
- a second passage formed between and communicating with the third chamber, the fluid inlet and the reservoir.

* * * * *